(12) United States Patent
Agarwal et al.

(10) Patent No.: US 10,884,896 B2
(45) Date of Patent: *Jan. 5, 2021

(54) VALIDATION OF CONTAINERS

(71) Applicant: CA, Inc., New York, NY (US)

(72) Inventors: Ankur Agarwal, Santa Clara, CA (US);
Prabhu Inbarajan, Fremont, CA (US);
Hyunji Kim, Sunnyvale, CA (US);
Natasha Festa, San Jose, CA (US);
Yuval Dagai, Pleasanton, CA (US)

(73) Assignee: CA, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,993

(22) Filed: Apr. 22, 2019

(65) Prior Publication Data

US 2019/0251013 A1 Aug. 15, 2019

Related U.S. Application Data

(63) Continuation of application No. 15/488,200, filed on Apr. 14, 2017, now Pat. No. 10,268,565.

(51) Int. Cl.
*G06F 11/36* (2006.01)
*H04L 29/06* (2006.01)
(Continued)

(52) U.S. Cl.
CPC ............ *G06F 11/3612* (2013.01); *G06F 8/60* (2013.01); *G06F 8/71* (2013.01); *G06F 8/75* (2013.01);
(Continued)

(58) Field of Classification Search
CPC .......... G06F 11/3612; G06F 8/60; G06F 8/71; G06F 8/75; G06F 9/44589;
(Continued)

(56) References Cited

U.S. PATENT DOCUMENTS 6,654,932 B1 * 11/2003 Bahrs ........................ G06F 8/24
715/210
6,775,824 B1    8/2004 Osborne, II et al.
(Continued)

OTHER PUBLICATIONS

Sharma et al., "Testing Container Classes: Random or Systematic?" (Year: 2011).*

(Continued)

*Primary Examiner* — Phillip H Nguyen
(74) *Attorney, Agent, or Firm* — Shook, Hardy & Bacon L.L.P.

(57) ABSTRACT

Techniques are disclosed relating to generating and validating a container for an application. A container for an application may an executable package that include the source code for the application along with the runtime information, system tools, system libraries, and settings for the application. A container validation procedure is determined for the container using a plurality of container validation routines. The container validation routines may reflect the role various validation entities have in validating the container and approving it for deployment. If the container successfully passes the container validation procedure, the container may be deployed on a computer system.

20 Claims, 13 Drawing Sheets

(51) Int. Cl.
*G06F 8/60* (2018.01)
*G06F 9/445* (2018.01)
*G06F 8/71* (2018.01)
*G06F 8/75* (2018.01)

(52) U.S. Cl.
CPC ...... *G06F 9/44589* (2013.01); *G06F 11/3604* (2013.01); *G06F 11/3688* (2013.01); *H04L 63/083* (2013.01); *H04L 2463/082* (2013.01)

(58) Field of Classification Search
CPC ............. G06F 11/3604; G06F 11/3688; H04L 63/083; H04L 2463/082
See application file for complete search history.

(56) References Cited

U.S. PATENT DOCUMENTS

| | | | |
|---|---|---|---|
| 8,510,712 | B1 | 8/2013 | Killmar, III |
| 9,367,305 | B1 | 6/2016 | Kumar et al. |
| 9,811,806 | B1 | 11/2017 | Kuang et al. |
| 9,916,233 | B1* | 3/2018 | Qureshi .............. G06F 9/45533 |
| 10,055,578 | B1 | 8/2018 | Marquardt et al. |
| 10,268,837 | B2 | 4/2019 | Agarwal et al. |
| 2003/0159137 | A1* | 8/2003 | Drake ...................... G06F 8/61 |
| | | | 717/172 |
| 2005/0060722 | A1 | 3/2005 | Rochette et al. |
| 2005/0164766 | A1 | 7/2005 | Haim et al. |
| 2013/0232498 | A1 | 9/2013 | Mangtani et al. |
| 2014/0137125 | A1 | 5/2014 | Hsu |
| 2014/0282433 | A1* | 9/2014 | Eilam ................. G06F 11/3676 |
| | | | 717/131 |
| 2015/0301824 | A1 | 10/2015 | Patton et al. |
| 2016/0132978 | A1 | 5/2016 | Bercow et al. |
| 2016/0134596 | A1 | 5/2016 | Kovacs et al. |
| 2016/0292399 | A1 | 10/2016 | Bercow et al. |
| 2016/0314302 | A1 | 10/2016 | Sabetta et al. |
| 2016/0378525 | A1 | 12/2016 | Bjorkengren |
| 2016/0380916 | A1 | 12/2016 | Gnaneswaran et al. |
| 2017/0054759 | A1 | 2/2017 | Lee et al. |
| 2018/0089068 | A1* | 3/2018 | Bhojan .................... G06F 8/61 |
| 2018/0232456 | A1* | 8/2018 | Sherman ............. G06F 9/45529 |

OTHER PUBLICATIONS

Pellegrino et al., "Deemon: Detecting CSRF with Dynamic Analysis and Property Graphs" (Year: 2017).*
Linux Journal, Geek Guide, Containers 101, 2016, 25 pages.
Arcuri et al., "Search based software testing of object-oriented containers," Information Sciences 187 (2008), pp. 3075-3095.

* cited by examiner

VALIDATION OF CONTAINERS

The present application is a continuation of U.S. application Ser. No. 15/488,200, filed Apr. 14, 2017 (now U.S. Pat. No. 10,268,565). The present application is also related to U.S. application Ser. No. 15/488,228 (now U.S. Pat. No. 10,268,837) filed Apr. 14, 2017. The disclosures of each of the above-referenced applications are incorporated by reference herein in their entireties.

BACKGROUND

Technical Field

This disclosure relates generally to computer applications, and, more specifically, to computer applications packaged in containers.

Description of the Related Art

One approach to computer application development is to directly install the application on the target computer system for evaluation and testing. Another approach is to install computer applications under development onto virtual machines as a way to control the environment for the computer software and to protect the rest of the computer system from malfunctions in the software. In part to consume fewer computing resources, developers have more recently begun using "containers," packaging formats that encapsulate a set of software and its dependencies.

SUMMARY

In an embodiment, a method for validating a container for an application is performed at a computer system. Source code for the application is received, and a container is generated for the application. The container is an executable package that includes the source code and runtime information for the application. A plurality of container validation routines is stored at the computer system, and the computer system receives validation information corresponding to at least two of the container validation routines. This validation information is received from validation entities who have a role in validating the container. The computer system determines a container validation procedure based on the validation information and then validates the container using the container validation procedure.

In another embodiment, a non-transitory computer-readable medium stores instructions that when executed by a computer system cause the computer system to receive source code for an application and generate a container for the application. The container is an executable package that includes the source code and runtime information for the application. The instructions cause the computer system to store a first container validation routine and a second container validation routine, receive first validation information approving or modifying the first container validation routine, and receive second validation information approving or modifying the second container validation routine. The instructions cause the computer system to determine a container validation procedure based on the first and second validation information, and validate the container using the container validation procedure.

In still another embodiment, an alternative method for validating a container for an application is performed at a computer system. A container for an application is received by the computer system. The container is an executable package that includes the source code and runtime information for the application. The computer system validates the container validation procedure including a plurality of container validation routines previously specified by a plurality of different validation entities. As part of the validation, the computer system provides an indication of individual results of the plurality of container validation routines, and an overall validation result based on the individual results.

In yet another embodiment, a non-transitory computer-readable medium stores instructions that, when executed by a server computer system, cause the server computer system to receive input from a user requesting validation of a container for an application. The instructions cause the server computer system to send, to an agent program running on a remote client computer system, a request to validate the container according to a container validation procedure that includes a plurality of container validation routines that are specified by a plurality of validation entities. The server computer system then receives, from the agent program, information relating to results of performing the plurality of container validation routines at the second computer system, and cause information indicating one or more results of the container validation procedure to be conveyed to the user.

In another embodiment, a method for validating a container for an application is performed with a computer system includes sending by a server computer system to a remote, client computer system over a secure connection, a request from a requesting entity (e.g., a user) to validate the container for an application according to a container validation procedure. The container validation procedure includes a plurality of container validation routines currently specified by a plurality of validation entities and also includes accessing private client information of the client computer system. The server computer system receives validation routine output information relating to results of performing the plurality of container validation routines at the client computer system. Additionally, the server computer system causes validation procedure output information indicating one or more results of the container validation procedure to be conveyed to the requesting entity. The validation procedure output information is based on the validation routine output information received from the second computer system. In this embodiment, the method is performed without communicating the accessed private client information to the server computer system.

In still another embodiment, a non-transitory computer-readable medium stores instructions that, when executed by a client computer system cause the client computer system to receive an indication from a server computer system to validate a container for an application and generate the container for the application. The instructions cause the client computer system to validate the container using a container validation procedure including a plurality of container validation routines specified by a plurality of different validation entities. The validating includes accessing private client information accessible to the client computer system and generating result information relating to results of performing the plurality of container validation routines. The instructions then cause the client computer system to send the result information, but not private client information accessed during validation, to the server computer system.

Figure 1:
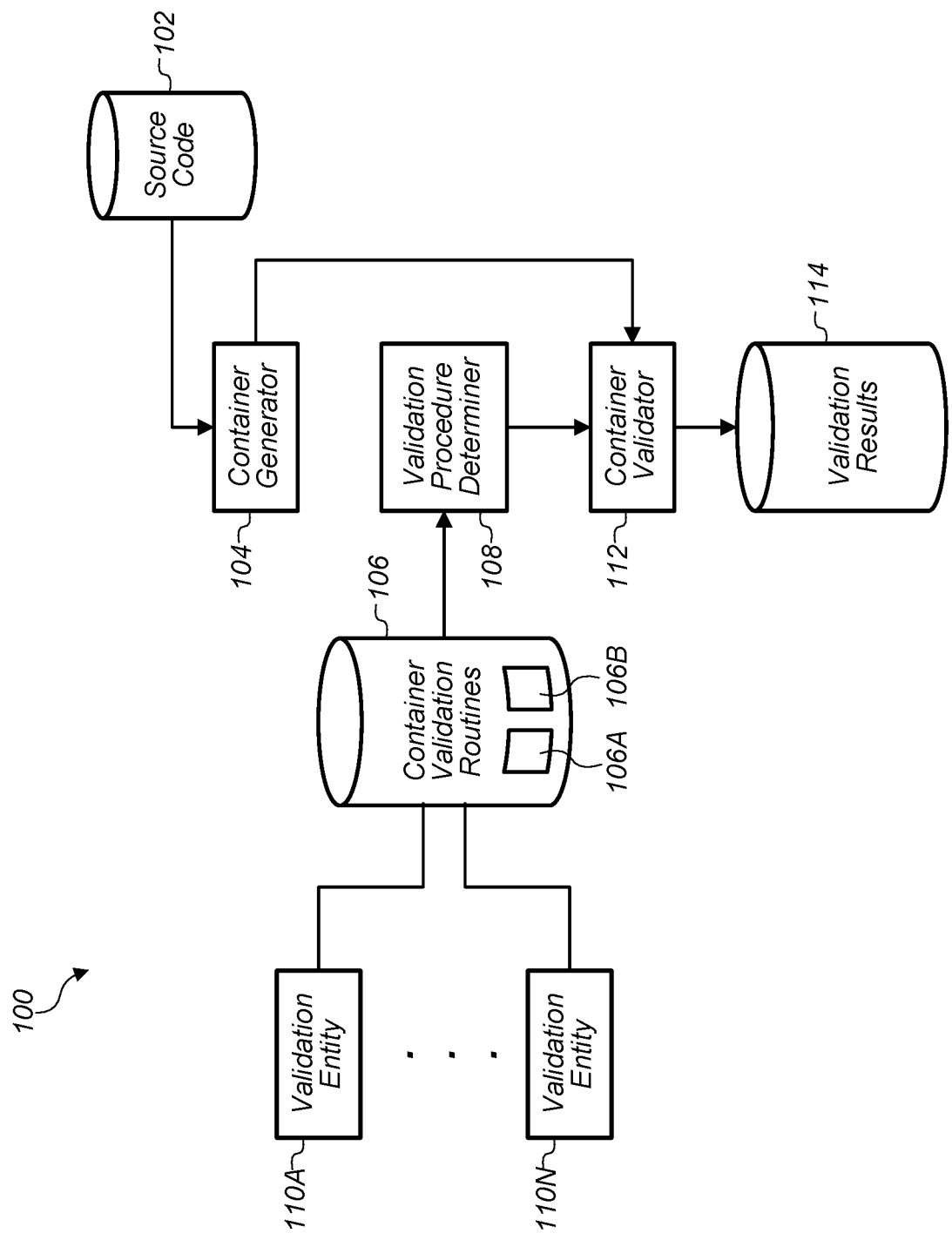
FIG. 1 is a block diagram illustrating one embodiment of a computer system configured to generate and validate a container for an application.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to generate a container for an application" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" container validation routines would not imply a temporal ordering between the routines unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of functions, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Turning now to FIG. 1, a block diagram of a computer system 100 configured to generate and validate a container for an application is shown. Storage 102 stores source code for one or more applications. A container generator module 104 receives source code for an application and generates a container for the application. Storage 106 stores container validation routines (e.g., a first container validation routine 106A and a second container validation routine 106B) and receives validation information approving or modifying container validation routines (e.g., first validation information approving or modifying the first container validation routine 106A, receive second validation information approving or modifying the second container validation routine 106B) from one or more validation entities 110. A validation procedure determiner module 108 determines a container validation procedure based on the validation information. A container validator module 112 validates the container using the container validation procedure. The container validator module 112 generates information relating to individual results of the plurality of container validation routines. Additionally, the container validator module 112 generates information relating to an overall validation result based on the individual results. Such information may be stored in storage 114.

Storage 102 may store source code for any number of applications, and may store source code owned by any number of entities. Storage 102 may be any suitable memory device or system in various embodiments including a single memory (e.g., a hard drive, solid-state drive, etc.), an array of memories, or a storage computer system. Storage 102 may be a hosting service remote from the rest of the system 100. Further, storage 102 may be a "git" or version control system usable by multiple entities to modify or review the source code (e.g., GITHUB.com).

Figure 2:
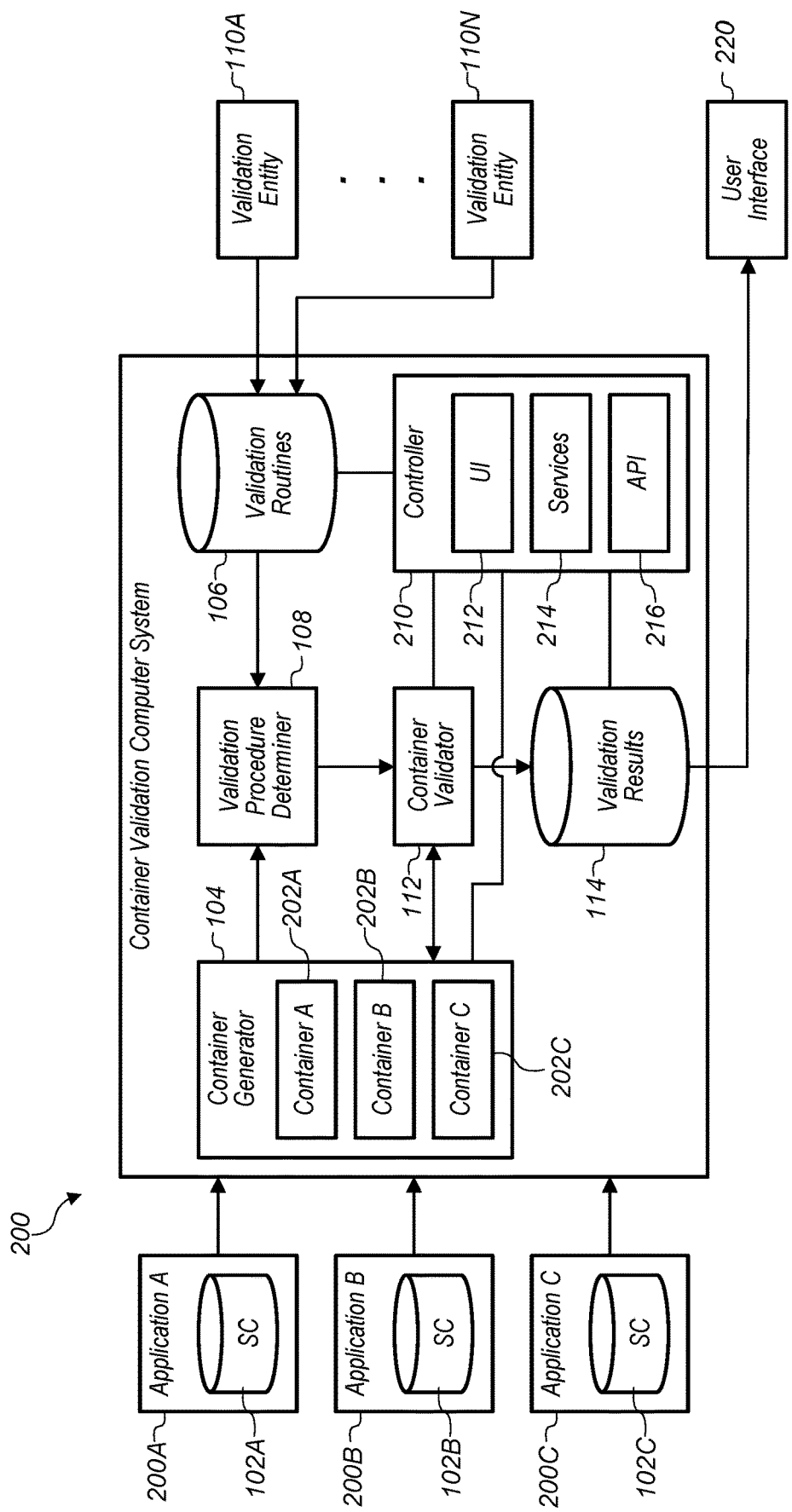
FIG. 2 is an expanded block diagram of the computer system of FIG. 1.

The container generator module 104 receives the source code for an application (e.g., from storage 102) and packages it with the runtime information, system tools, system libraries, and settings for the application. The container generation module 104 may analyze the source code for an application to determine the specifications for the container for that application and/or the container generator module 104 may receive input from one or more entities (e.g., a user accessing a user interface 220 as shown in FIG. 2). As discussed herein, certain portions of the container validation procedure (e.g., certain container validation routines included in the container validation procedure) may be performed concurrently with the generation of the container (e.g., validating that the source code is compilable during container generation). The container generator module 104 may be implemented on the same computer system as the rest of the system 100 (as shown in FIG. 2) or may access a remote container generation module (e.g., a DOCKER® server). The container generator module 104 may generate a container for an application in discrete steps, some of which may be performed serially and some of which may be performed in parallel. After the container generation process is complete, the output of the container generator module 104 may be a final output container. The final output container may be an executable container implementing the application. The computer system 100 may perform additional validation on the final output container as discussed herein.

Storage 106 may store the plurality of container validation routines, including, for example, a first validation routine 106A and a second validation routine 106B. Container validation routines are received from validation entities 110. Storage 106 may also store APIs or other programs to interface (e.g., by sending information about a container being validated) with container validation routines that are stored and run on remote computer systems (e.g., a computer system owned by a vendor). Some of the validation routines may include criteria to evaluate source code for an application or the container for the application (e.g., criteria related to whether a container includes security vulnerabilities) while others may include criteria to manage the container validation process (e.g., criteria to determine whether the process of validating the container meets regulatory requirements set by a government agency). Such validation routines generally fall into one or more of three categories: build validation routines, provisioning validation routines, and quality assurance validation routines. In some cases, such categorization may depend on when in the lifecycle of a container the particular routine is performed, and some validation routines may fall into more than one category (e.g., security validation routines may include build validation routines, provisioning validation routines, and quality assurance validation routines).

Generally, build validation routines, provisioning validation routines, and quality assurance validation routines are used to determine whether the source code for an application is acceptable, whether the container around the application is acceptable, and whether the containerized application and/or the container validation procedure used to validate are acceptable, respectively. Build validation routines are validation routines performed on the source code as part of compiling and debugging the application and as such include but are not limited to criteria related to whether the source code for an application can be compiled, whether the source code is acceptable under unit test standards, whether the source code has possible bugs or coding errors (e.g., lints), whether the source code is acceptable under static code analysis standards, etc. Certain build validation routines are standard for all container validation procedures, while others may depend on the language of the source code and the intended deployment environment (e.g., different technology stacks) of the application. The disclosed techniques are not tied to any particular source code language or environment and may be used with any source code or deployment environment. Provisioning validation routines are validation routines relating to determining whether a container have been properly generated and whether it includes the proper components and infrastructure for the application. Provisioning, as used herein, relates to the automated provisioning of infrastructure within a container and includes techniques persons of skill in the art may also refer to as "baking" and "frying." Quality assurance validation routines are validation routines relating to determining whether the container will meet certain performance criteria after being generated and/or whether the container validation process has met evaluation criteria (e.g., compliance with the entity requesting validation's software development process, regulatory compliance).

Container validation routines include by are not limited to software configuration management (SCM) validation routines, artifact repository validation routines, release validation routines, security validation routines, reporting validation routines, active policy management (APM) validation routines, testability validation routines, bake standards validation routines, measurement validation routines, identity and access management (IAM) validation routines, secret management validation routines, monitoring validation routines, service assurance validation routines, and domain assurance routines. SCM validation routines relate to integration with multiple source code control systems, whether source code is retrieved and built properly, and/or the general stability of the source code. Artifact repository validation routines relate to verifying whether software artifacts are capable of being sent to one of various artifact repository systems (e.g., JFROG ARTIFACTORY™) and whether such software artifacts have been properly sent. Release validation routines relate to verifying release, limited deployment, full deployment, and/or rollback functions for a container runtime and may depend (in full or in part) on the intended deployment environment of the container. Security validation routines relate determining whether a container has security vulnerabilities (e.g., in the source code for the application, in the container) and may include static and dynamic container security analysis and alerting procedures. APM validation routines relate to verifying the management access and audit policies of software that may run on a container being verified. Testability validation routines relate to the validation of application and container software across one or more testing methods including but not limited to unit tests, integration tests, functional tests, automation tests, security tests, performance tests, etc. Bake standards validation routines relate to determining whether the container being validated complies with the container standards (as set by one or more container standard-setting bodies) of the container's target deployment environment (e.g., whether a container meets DOCKER® container standards if it is intended to be deployed on a DOCKER® server).

Measurement validation routines relate to how metrics are collected, assessed, and/or reported across various stages of container generation and container validation. IAM validation routines relate to authentication of one or more of the entities requesting that a container be generated and validated and ensuring such an entity has the necessary authorizations (e.g., determining that an entity requesting validation of a container built with source code belonging to Company A has authorization from Company A to do so). Secret management validation routines relate to managing the various password credentials, certificate credentials, security tokens, user names, multi-factor authentications, etc. used throughout various stages of the container generation and validation process. Monitoring validation routines relate to managing container monitoring and reporting (e.g., in a user interface). Service assurance validation routines relate to the codification of container management and software development processes and verification of compliance with such a process. Domain assurance routines relate to verifying compliance with higher level domain concerns including but not limited to separation of duties, Sarbanes-Oxley Act compliance, payment card industry standards compliance, Health Insurance Portability and Accountability Act compliance, etc. Reporting validation routines relate to reporting and analytics on the entire container and validation process.

Each validation routine includes one or more criteria upon which a container is evaluated. Some criteria may be based on the type of application being implemented by the container, the language of the source code for the application, the intended deployment environment for the container, the entity requesting the generation and validation of the container, etc. Some criteria may be simple pass or fail criteria, and others may count errors, vulnerabilities, deficiencies, etc. and the validation routine may include a sum criteria indicating a total evaluation based on the summed errors, vulnerabilities, deficiencies, etc. For example, a security validation routine may include checks for security vulnerability deficiencies including high vulnerability deficiencies and/or critical vulnerability deficiencies and a sum criteria to evaluate the application based on the number of high and critical vulnerability deficiencies detected (e.g., less than 15 high and 2 critical is a pass with an A rating, less than 20 high and 3 critical is a pass with a B rating, more than 30 high and/or 5 critical is a fail with an F rating, etc.).

Some validation routines (e.g., security validation routines) may be usable to determine whether a container in the midst of being generated meets certain requirements (e.g., security requirements) while some may be usable to determine whether a final output container meets certain requirements (e.g., domain assurance validation routines). The validation routines may be default validation routines that may be modified and/or approved for use to validate a container for an application. Such modifications or approvals may be validation information received from a plurality of validation entities 110. Accordingly, some received validation information may approve default values for a particular one of the plurality of container validation routines, and other received validation information may modify default values for a particular one of the plurality of container validation routines. Validation information may include evaluation thresholds to be used in conjunction with container validation routines. For example, the validation information may include instructions for a container to fail a security validation routine if the container, upon validation, is determined to have more than three critical security vulnerabilities and/or more than fifteen high security vulnerabilities. Validation information may also include information specifying parameters for container validation routines such as the type of application being run on the container (e.g., database management, user interface, video playback, etc.), the target deployment environment (e.g., a DOCKER® server, an AMAZON WEB SERVICES® server, etc.), the language of the source code for the application, etc. As with storage 102, storage 106 may be any suitable memory device or system in various embodiments including a single memory (e.g., a hard drive, solid-state drive, etc.), an array of memories, or a storage computer system. Storage 106 may be a hosting service remote from the rest of the system 100.

The validation entities 110 are entities that may input container validation routines or provide validation information to modify or approve validation routines or both. These validation entities 110 have a role in validating the container by determining, for example, which criteria to apply to the container and/or how such criteria are applied. For example, validation entities 110 may include personnel reporting to the entity seeking to generate and validate a container such as software developers and engineers, engineering managers, DevOps engineers, enterprise architects, chief technology offers, etc. Validation entities 110 may also include committees reporting to the entity seeking to generate and validate a container such as a change management committee, compliance committee, etc. In some embodiments, the validation entities 110 may include third-party software, software platforms, or vendors used to generate or validate a container such as GITHUB® (e.g., for SCM validation), JENKINS™ (e.g., for build validation), TWISTLOCK® (e.g., for security validation), SAFENET® (e.g., for secret management validation), etc. Multiple validation entities may be associated with a particular validation routine (or routines), with a particular validation entity 110 providing the container validation routine with another validation entity 110 modifying or approving the container validation routing. For example, a security validation routine may be provided by a vendor providing security validation services (e.g., applying techniques to the container to identify security vulnerabilities) and a security engineer working for the entity seeking validation of a container may approve or modify the security validation routine (e.g., by inputting validation information as discussed herein). The number of validation entities 110 may be relatively large (e.g., in the tens to hundreds) depending on the type of application being developed. It is common for the development, validation, and release of enterprise software to involve hundreds of developers and dozens (or more) of validation entities 110.

Such validation entities 110 may send validation information to storage 106 by approving default values for a particular one of the plurality of container validation routines, modifying default values for a particular one of the plurality of container validation routines, or by inputting additional container validation routines. Additionally, the validation entities 110 may approve multiple container validation routines, modify multiple container validation routines, or input additional container validation routines. The validation entities 110 may send container validation routines or validation information to storage 106 in any number of ways, including via a human making use of a user interface, via an application program interface, etc. Container validation routines and validation information may be received by storage 106 from any number of remote computer systems. Different validation entities 110 may be granted different credentials and area(s) of access. A validation entity's 110 ability to submit validation information and thereby approve, modify, or input container validation routines may depend on the validation entity's 110 credentials and area(s) of access. Thus, a first validation entity may be permitted to convey validation information for at least one, but not all, of the plurality of container validation routines. For example, a first validation entity 110 may be security-related (e.g., software security personnel for the organization developing an application, a third-party vendor contracted to evaluate an application under development for security issues, etc.) and thus may be permitted access to the security validation routines but not, for example, the reporting validation routines, APM validation routines, testability validation routines, or bake standards validation routines.

The validation procedure determiner module 108 determines a container validation procedure based on the validation information received from the validation entities 110 (e.g., validation information approving, modifying, and/or inputting container validation routines). The container validation procedure may slot the various container validation routines into an ordered list in which container validation routines at the beginning of the list are performed before routines that come afterwards. The various container validation routines may be put in any order, but it may be advantageous to perform certain routines first. For example, it may be more efficient (compared to the inverse) to perform build validation routines and artifact repository validation routines (among others) before IAM validation routines and secret management validation routines. This may be, because, if the source code fails the build validation routines and artifact repository validation routines, the application may be too unstable to properly evaluate whether the application would pass the IAM validation routines or secret management validation routines. Even if the application is stable, failing certain container validation routines may be dispositive (e.g., a security validation routine) in determining that the application has failed the entire container validation procedure. Accordingly, the container validation procedure may include early termination points whereby the container validation procedure ends after the application has failed a dispositive container validation routine. Alternatively, the container validation procedure may continue until the end to determine whether the application has passed the remaining container validation routines, but the final result may be a failure after a dispositive failure regardless of the subsequent results.

In some embodiments, the container validation procedure may be determined prior to receiving the source code for the application. In embodiments configured to make use of predetermined container validation procedure(s), validating subsequently received source code for different applications may be performed based on a current (as of the time source code is received) container validation procedure. Such a current container validation procedure may include container validation routines that have been approved and/or modified as discussed herein.

The container validator module 112 validates the container using the container validation procedure. Accordingly, the container validator module 112 may analyze the container against each container validation routine in the container validation procedure. A container may be received by and analyzed by the container validator module 112. Such a container may be a final output container as discussed herein or a non-final container that is received by the container validator module 112 before being fully generated (e.g., a container that has been built but not baked). Additionally, when the final product of the container generate module 104 is a final output container, the container validator module 112 may complete a first container validation routine prior to generation of the final output container and complete a second container validation routine after generation of the final output container. Additionally or alternatively, the container may be validated, as it is being generated, by the container generator module 104 and the container validator module 112 exchanging information about the container. Accordingly, each container validation routine in the container validation procedure may be performed on the container with the container validator module 112 or the container validator module 112 in conjunction with the container generator module 104.

The container generator module 104 generates a container according to a container generation procedure, and the container validation module 112 may validate the container according to the container validation procedure as the container is being generated, after a final output container has been generated, or both. The container generation procedure includes steps to assemble the various components of the container for an application and may also include steps to verify that the various components have been assembled correctly. In contrast to the container generation procedure, the container validation procedure includes container validation routines relating to ensuring that the container, having been properly assembled, meets various other criteria. For example, a container for an application can be properly assembled and therefore pass validation steps in the container generation procedure, but nonetheless fail the container validation procedure any of a number of reasons including but not limited to the source code for the application cannot be compiled, the properly assembled container has not been properly provisioned (e.g., infrastructure is missing), the containerized application has security vulnerabilities, the container does not meet the required container standards for its intended deployment environment, etc.

The container validator module 112 may generate information relating to individual results of the plurality of container validation routines. The individual results may measure, for a container, one or more of (but not limited to): security, performance, scalability, utilizability, and testability. For example, each particular validation routine may be passed or failed and given a letter grade based on the results of the validation according to the particular validation routine (e.g., after performing the security validation routine an application may pass and receive an A grade). In some embodiments, multiple validation routines that may be related by subject matter evaluated may be grouped together and given a group result. Additionally, the container validator module 112 may generate information relating to an overall validation result based on the individual results and/or group results. The overall result may be a calculated by any number of techniques including an unweighted average of the individual and/or group results, a weighted average of the individual and/or group results, a median of the individual and/or group results, the lowest of the individual and/or group results, etc. The results may include an indication that signifies that the container is not suitable for deployment, or alternatively that the container is suitable for deployment. These individual, group, and/or total validation results may be stored in storage 114. If a container is suitable for deployment, the container may be deployed at a deployment computer system (not shown). The container suitable for deployment may be communicated to the deployment computer system by sending the container through a private or public network (e.g., the internet), for example.

Storage 114 may store the results of any number of container validation procedures, including container validation procedures performed on various applications from various organizations (e.g. Application 1 and Application 2 from Organization A, Applications 3-5 from Organization B, etc.). Storage 114 may be any suitable memory device or system in various embodiments including a single memory (e.g., a hard drive, solid-state drive, etc.), an array of memories, or a storage computer system. Storage 114 may be a hosting service remote from the rest of the system 114. The information stored in storage 114 may be used (e.g., by users, validation entities 110, etc.) to approve a container for deployment or to improve source code for applications, container validation routines, container validation routines, container generation procedures, etc.

The computer system 100 may, in some embodiments, be used to streamline the validation and deployment of containers for applications. As discussed above, software development (and particularly development of enterprise software), may involve hundreds of developers and dozens of validation entities 100. The computer system 100 may be used, however, in some cases, to streamline development by managing the validation process, ensuring that each validation entity 110 involved in the validation can provide input through container validation routines, validation information relating to container validation routines, or both. Additionally, because the container validation routines relevant to the validation entity 110 may be modified, approved, or input independent of receiving source code and generating a container, when the time comes to validate a container the computer system 100 may generate a container validation procedure using container validation routines that have already been approved or modified. This means that the container validation routines relevant to a particular validation entity 110 may, in some cases, be applied rapidly to the container without needing further input from the validation entity 110 (which may entail additional communication latency). Further, because it may be likely that a validation entity 110 may validate multiple containers using the same criteria, the validation procedure may be further streamlined by the validation entity 110 modifying, approving, or inputting a container validation routine to be used to validate all relevant containers until the validation entity 110 indicates otherwise or makes a modification. Accordingly, the time to validate a container may be reduced dramatically: from months or weeks to hours or minutes.

Referring now to FIG. 2, an expanded block diagram of a computer system 100 configured to generate and validate a container for an application is shown. FIG. 2 includes all of the components shown in FIG. 2, as well as additional components such as items representing multiple applications 200, a controller 210, a container validation computer system 230, and a user interface 220.

The applications 200 (e.g., an application 200A, an application 200B, an application 200C) are any number of separate software applications each with its own respective source code (e.g., source code 102A, 102B, 102C). The container generator module 104 may generate and the container validator module 112 may validate a respective container 202 (e.g., container 202A, container 202B, container 202C) for each application 200. The system 100 may be configured to generate and validate multiple containers 202 simultaneously. Accordingly, the system 100 may include a plurality of container validation platforms (e.g., the modules 104, 108, and 112 that generate a container, determine a container validation procedure for a container, and validate a container, respectively) operating on the computer system, with some or all of the container validation platforms using a different current container validation procedure. The validation of the multiple containers 202 may include using separate sets of container validation routines and a separate container validation routine for each container 202, or the validation of the multiple containers 202 may include using one or more common container validation routines for two or more containers 202.

The controller 210 controls the various components of the container validation computer system 230 and may implement features in addition to those discussed above. The controller 210 may include a user interface (UI) module 210, a services module 214, and an application programming interface (API) module 216. The UI module 212 may be configured to present a controllable user interface to any numbers of users via a user interface 220. The services module 214 may perform any number of tasks to facilitate the container generation and validation processes discussed herein. Such services may include determining whether users are authorized to access the system 100, handling one and two-factor authorization of users and validation entities, measure usage of the system by a user to charge the user for said use, scheduling container generation and validation (e.g., scheduling to perform a validation at a predetermined time), tabulating validation results, determining the status of the system 100, etc. The API module 216 may be any number of APIs usable to communicate with various other programs running on other computer system (e.g., an API for a validation entity).

The user interface 220 may be accessible by any number of users seeking to access the system 100, and may be implemented on any of a number of devices being accessed by the user (e.g., a desktop computer, laptop computer, tablet computer, mobile device, workstation, etc.). Such users may be validation entities, persons representing validation entities, persons seeking to generate and validate containers, administrators of the system 100, etc. The user interface 220 may be usable receive commands from a user to initiate the processes discussed herein to generate and validate a container for an application, to convey representations of validation results to the user (for example, FIGS. 8, 9A, and 9B discussed herein), to present representations of container validation routines and approvals or modifications to the container validation routines, etc. The user interface 220 may be a graphical user interface, a command line interface, or both.

The container validation computer system 230 may include the container generator module, a validation procedure determiner module 106, storage 108, a container validator module 112, and storage 114 shown in FIG. 1. The container validation computer system 230 may also include the controller 210. The container validation computer system 230 may be implemented on a single server, a single computer system (e.g., an enterprise computer system), or distributed on a cloud of servers as software-as-a-service (SaaS). Persons and organizations seeking to generate and/or validate containers for applications 200 may install (e.g., with a computer readable medium) a container validation computer system 230 in their client computer systems, or they may access a SaaS version of the container validation computer system 230 through the internet or another network.

Figure 3:
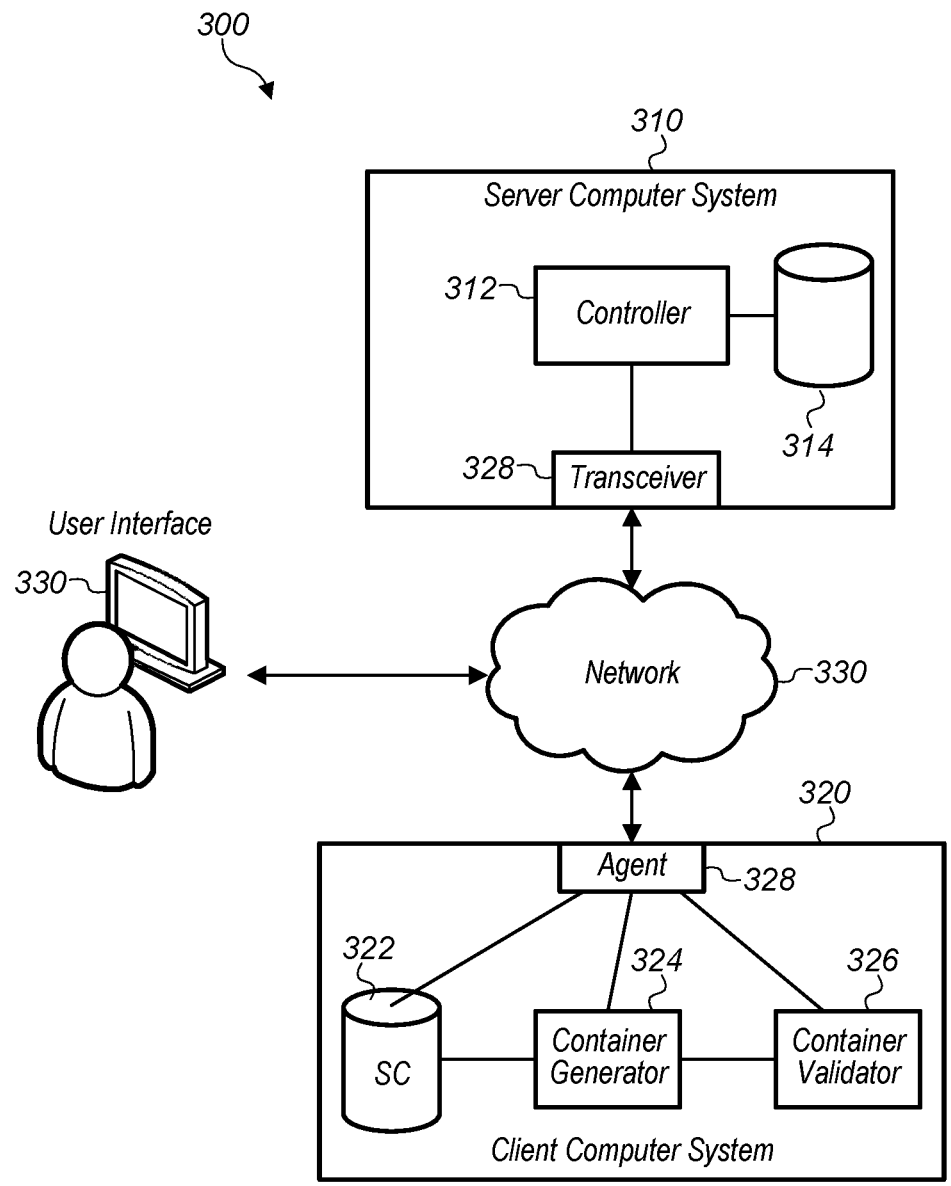
FIG. 3. is a block diagram illustrating another embodiment of a computer system configured to generate and validate a container for an application.

Turning now to FIG. 3, a block diagram of a computer system 300 configured to generate and validate a container for an application is shown. The computer system 300 includes a server computer system 310, a client computer 320, a network 330, and a user interface 340. Many of the components of the computer system 300 are similar to the components of FIG. 2 except that instead of having a container validation computer system 230, the computer system 300 distributes many of the processes and functions of the container validation computer system 230. These processes and functions are performed by the server computer system 310 and the client computer system 320 with the two computer systems 310 and 320 communicating with each other over the network 330. As discussed herein, distributing these processes and functions allows for the validation of containers without having to send private client information stored on the client computer system 320 to the server computer system 310.

The server computer system 310 may include a controller 312, storage 314, and a transceiver program 316. The controller 312 may be analogous to the controller 210 of FIG. 2, and may include an analogous UI module 210, services module 214, and API module 216 (not shown in FIG. 3). The UI module may be configured to present a controllable user interface to any numbers of users via a user interface 340. The services module may perform any number of tasks to facilitate the container generation and validation processes discussed herein. Such services may include determining whether users are authorized to access the system 300, handling one and two-factor authorization of users and validation entities, measure usage of the system by a user to charge the user for said use, scheduling container generation and validation (e.g., scheduling to perform a validation at a predetermined time), tabulating validation results, determining the status of the system 300, etc. The API module may be any number of APIs usable to communicate with various other programs running on other computer system (e.g., an API for a validation entity). The controller 312 may also include a validation procedure determiner module (not shown) that is analogous to the validation procedure determiner module 108 of FIG. 1. Alternatively, the server computer system 310 may include a validation procedure determiner module (not shown) implemented separately from the controller that is analogous to the validation procedure determiner module 108 of FIG. 1.

The validation procedure determining module (not shown) of the server computer system 310 determines the container validation procedure and sends the container validation procedure to the agent program 328 running on the client computer system 320. As discussed below, the container validation routines that are included in the container validation procedure may be sent from the server computer system 310 to the client computer system 320, or the client computer system 320 may receive some or all of the container validation routines from the validation entities (not shown) without first passing through the server computer system 310.

The server computer system 310 also includes storage 314. Storage 314 may be any suitable memory device or system in various embodiments including a single memory (e.g., a hard drive, solid-state drive, etc.), an array of memories, or a storage computer system. Storage 314 may be a hosting service remote from the rest of the system 100. Storage 314 may be analogous to storage 114 of FIG. 1 and may store information relating to results of performing the plurality of container validation routines at the client computer system 320 in a manner. Storage 314 may also be analogous to storage 106 of FIG. 1 and may store one or more container validation routines and receive validation information from one or more validation entities (not shown).

The server computer system 310 may also include a transceiver program 316. The transceiver program 316 may facilitate secure communication with the client computer system and establish a secure connection between the transceiver program and an agent program 328 running on the client computer system 320. This connection may be secured, for example, through the use of a public-private key exchange, encryption, etc.

The client computer system 320 includes storage 322, a container generator module 324, a container validator module 326, and an agent program 328. Storage 322 may be analogous to storage 102 of FIG. 1 and may store source code (abbreviated "SC" in FIG. 3) for one or more applications. The container generator module 324 is analogous to the container generator module 104 of FIG. 1 any may receive source code for an application from storage 102 and generate a container for the application as discussed herein. The container validator module 326 is analogous to the container validator module 112 of FIG. 1, and validates the container using a container validation procedure including a plurality of container validation routines specified by a plurality of different validation entities (not shown). The agent program 328 runs on the client computer system 320 and facilitates secure communication with the server computer system 310 and may establish a secure connection with the transceiver program 316.

Similar to the container validator module 112 of FIG. 1, the container validator module 326 validates the container using the container validation procedure. Accordingly, the container validator module 326 may analyze the container against each container validation routine in the container validation procedure. A container may be received by and analyzed by the container validator module 326. Such a container may be a final output container as discussed herein or a non-final container that is received by the container validator module 326 before being fully generated (e.g., a container that has been built but not baked). Additionally, when the final product of the container generate module 324 is a final output container, the container validator module 326 may complete a first container validation routine prior to generation of the final output container and complete a second container validation routine after generation of the final output container. In some embodiments, the container may be validated as it is being generated by the container generator module 324 and the container validator module 326 exchanging information about the container. Accordingly, (and similar to the container generator module 104 and container validator module 112 of FIG. 1), each container validation routine in the container validation procedure may be performed on the container with the container validator module 326 or the container generator module 324 in conjunction with the container generator module 326.

The container validator module 326 may generate information relating to individual results of the plurality of container validation routines. Additionally or alternatively, multiple validation routines that may be related by subject matter evaluated may be grouped together and given a group result. Additionally, the container validator module 326 may generate information relating to an overall validation result based on the individual results and group results. The results may include an indication that signifies that the container is not suitable for deployment, or alternatively that the container is suitable for deployment. These results may be sent by the agent program 328 of the client computer system 320 to the transceiver 316 of the server computer system 310. However, the agent program 328 does not send any source code or private data stored on the client computer system 320 to the server computer system 310. The server computer system 310 may store these individual, group, and/or total validation results in storage 314.

The computer system 300 also includes a network 330 facilitating communication between the server computer system 310, client computer system 320, and user interface 340. The network may be any private or public network (e.g., the internet) and may include wired and/or wireless connections between various devices on the network. The user interface 340 is analogous to the user interface 220 of FIG. 2 and may run on any number of devices being access by the user (e.g., a desktop computer, laptop computer, tablet computer, mobile device, workstation, etc.). The user interface 340 may be usable to receive input from a user requesting validation of a container for an application and may convey information indicating one or more results of the container validation procedure to the user.

One potential advantage of the computer system 300 of FIG. 3 is that a container may be generated and validated while reducing the risk of disclosure of private client information. A container for an application may be generated without the source code of the application leaving the client computer system 320. Similarly, a container may be validated using private client information stored on the client computer system without sending the private client information over the network 330, thus also keeping the private client information more secure. As used herein, private data of an entity simply refers to some set of data that the entity wishes to protect, such as by restricting dissemination or who can access the data. Various organizations such as financial institutions, medical institutions, government institutions, or other organization desiring to validate containers without exposing private and/or sensitive information may validate containers without exposing said information to additional risk of disclosure. Additionally or alternatively, installing and setting up the agent program 328, container generator module 324, and container validator module 326 on a client computer system may require fewer man-hours and less expense than setting up all of the components of the computer system 100 on the client computer system 310 or transferring source code and private client data to a computer system 100, which may allow an organization to test the container validation techniques disclosed herein without first committing to a full installation and integration.

Figure 4:
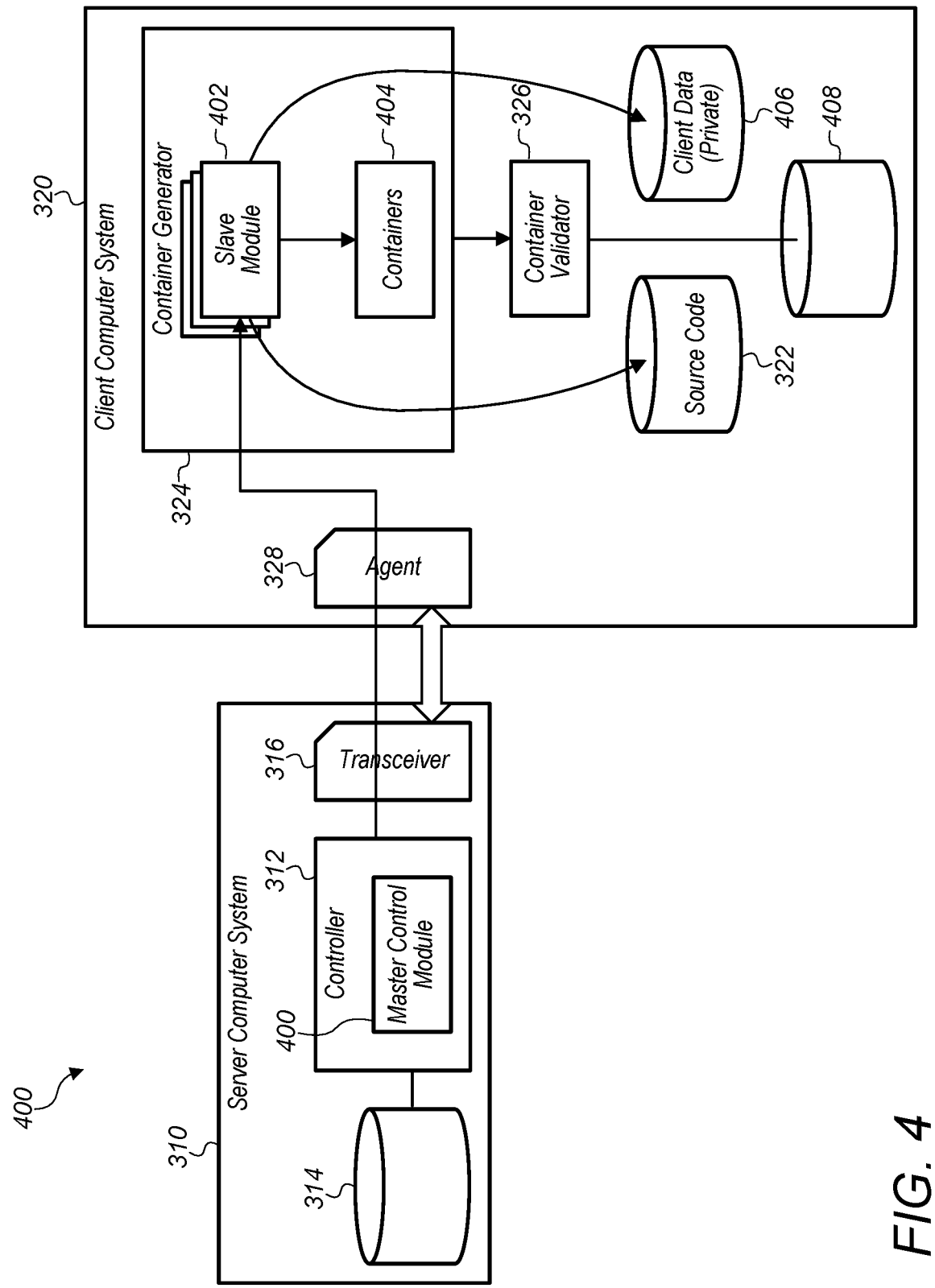
FIG. 4 is an expanded block diagram for the computer system of FIG. 4.

Referring now to FIG. 4, an expanded block diagram of a computer system 300 configured to generate and validate a container for an application is shown. FIG. 4 includes many of the components shown in FIG. 3, as well as additional components such as items representing a master control module 400, multiple slave modules 402, a container 404, storage 406 for storing private client information, and storage 408 for storing private container validation routines.

The master control module 400 and multiple slave modules 402 work together to perform various tasks associate with generating the container 404. In general, the master control module 400 sends control information to control one or more slave modules 402 running on the client computer system 320, and the slave modules 402 are controlled based on the control information as part of the container validation procedure. Separating the functions of the master control module 400 and the slave modules 402 allows for the generation and validation of containers within the client computer system 320 without private client information leaving the client computer system 320. The master control module 400 controls the various processes of container generation and validation disclosed herein by sending control information to the slave modules 402 (e.g., control information to begin the container generation process to make a container for an application, control information to compile source code for the application), but without receiving private client information. Such control information may include the container validation procedure for client computer system 320 to use to validate a container. Using control information from the master control module 400, the slave modules 402 provides a container validation platform within the client computer system 320 that may use private client information during the container generation and validation process. The master control module 400 and the one or more slave modules 402 may be mutually authenticated and coupled by bidirectional trusted connections for a higher level of security and to reduce vulnerability to attacks.

The container 404 may be generated at the client computer system 320 using source code stored on the client computer system in storage 322. It will be understood that by not sending the source code over the network 330 to the server computer system 310, the source code will be kept more secure. Storage 406 may store private client information. As noted above, such information may be any kind of information that the person or organization that operates the client computer system may wish to protect from disclosure. Examples include private health information, customer financial information, classified government intelligence, etc. Such information may be kept in storage 406 and used by the container generator module 324 and/or the container validator module 326 of the client computer system 320 to generate and validate a container, without exposing the private client information to the rest of the system 300 or the rest of the world.

Storage 408 may store a plurality of container validation routines and validation information approving or modifying the container validation routines. Some of the plurality of container validation routines (e.g., default container validation routines) may be received from the server computer system 310. Storage may also receive user input (e.g., validation information received via the user interface 340 [not shown in FIG. 4]) specifying a modification of one of the plurality of container validation routines received from the server computer system 310, and store the modified first container validation routine at the client computer system 310 for use as part of the container validation procedure at the client computer system 310 as discussed herein. Additionally, storage 408 may receive input from a user (e.g., via the user interface 340 [not shown in FIG. 4]) specifying a new container validation routine, and store the new container validation routine at the client computer system 310 in storage 408. The new container validation routine may be performed the as part of the container validation procedure as discussed herein.

Figure 5A:
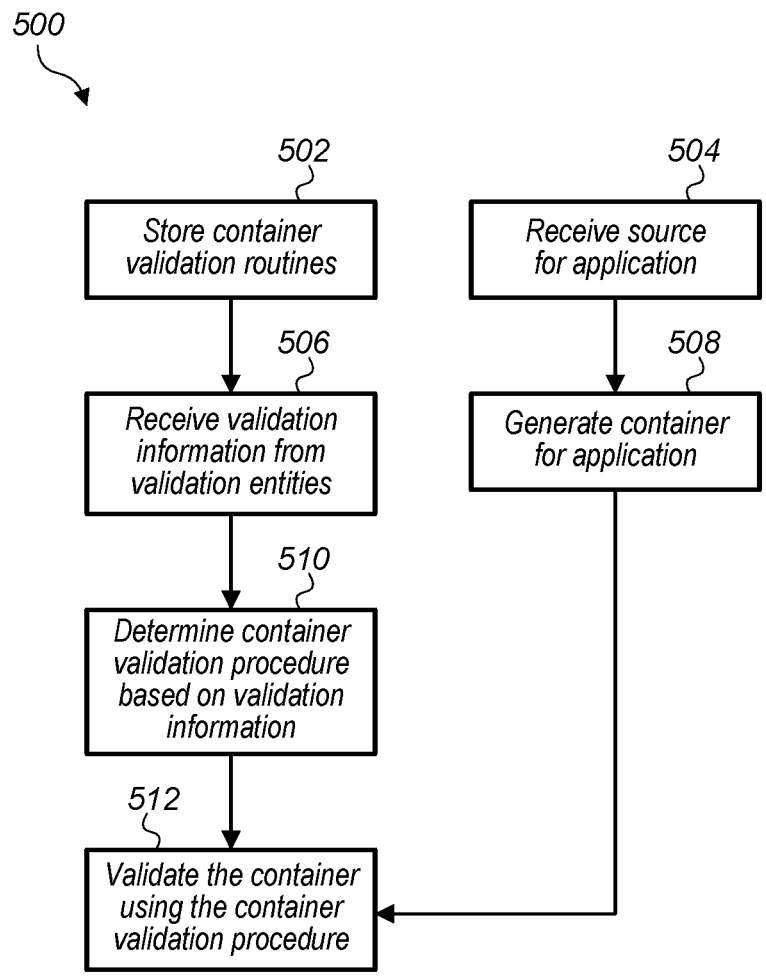
FIG. 5A is a flowchart illustrating a container validation method in accordance with the disclosed embodiments.

FIGS. 5A-7B illustrate various flowcharts representing various disclosed methods implemented with the computer system 100 and/or computer system 300. Referring now to FIG. 5A, a flowchart illustrating a container validation method 500 is shown. The method 500 may be performed with the computer system 100 or computer system 300. At block 502, the computer system 100 (e.g., with storage 106) or computer system 300 (e.g., with storage 314 and/or storage 408) stores a plurality of container validation routines. At block 506, the computer system 100 or computer system 300 receive validation information (e.g., validation information approving or modifying default values for a particular one of the plurality of container validation routines) from validation entities, the validation information corresponding to at least two of the plurality of container validation routines. At block 510, the computer system 100 (e.g., with validation procedure determiner module 108) or computer system 300 determines the container validation procedure based on the validation information. At block 504, the computer system 100 (e.g., with storage 102) or computer system 300 (e.g., with storage 322) receives source code for an application. At block 508, computer system 100 (e.g., with container generator module 104) or computer system 300 (e.g., with container generator module 324) generates a container for the application, wherein the container is an executable package that includes the source code and runtime information for the application. At block 512, the computer system 100 (e.g., with container validator module 112) or computer system 300 (e.g., with container validator module 326) validates the container using the container validation procedure. It will be understood that blocks 502, 506, and 510 may be performed in parallel or at a different time than blocks 504 and 508. Further, in some embodiments, instead of receiving the source code for an application and generating a container for the application, the method 500 may include receiving a container for an application.

Figure 5B:
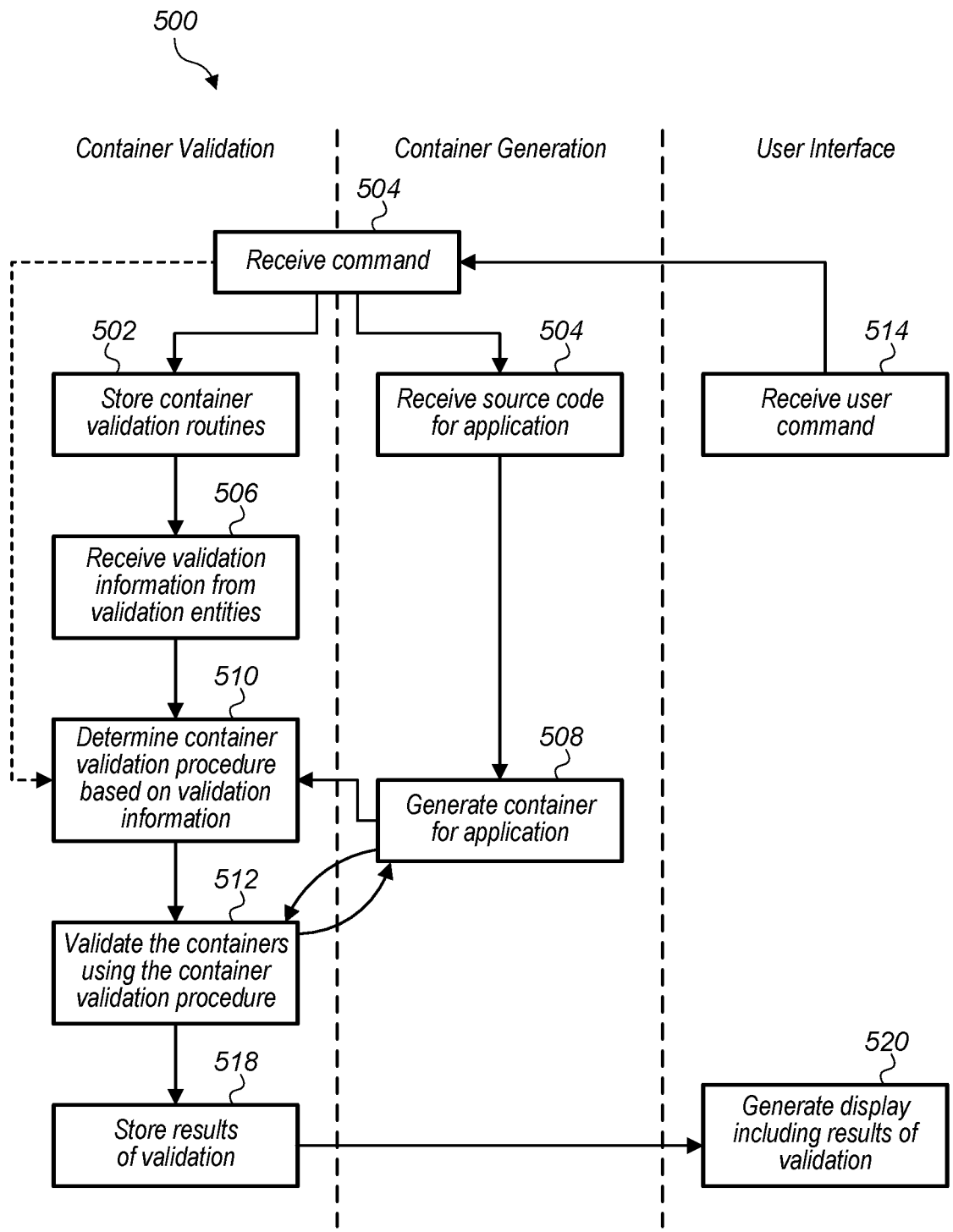
FIG. 5B is an expanded flowchart of the container validation method of FIG. 5A in accordance with the disclosed embodiment.

Referring now to FIG. 5B, an expanded flowchart illustrating a container validation method 500 is shown. FIG. 5B includes the blocks illustrated in FIG. 5A with additional optional steps. FIG. 5B may be performed with the computer system 100 or computer system 300. At block 514, a user interface (e.g., a user interface 220, 340) receives a user command. At block 516, the user command is received (e.g., at the container validation computer system 230, at the server computer system 310, at the client computer system 320). The received user command may then be sent to a container validation module (e.g., a container validation module 112, 326) and/or a container generation module (e.g., a container generation module 104, 324) and the method may continue at blocks 502 and 504 as discussed herein. In some embodiments (e.g., when the container validation routines are stored and validation information received from validation entities before the user command is received), the received user command may be sent to a container validation module (e.g., a container validation module 112, 326) and the method may continue at blocks 510 and 504 as discussed herein. In such embodiment, the container validation procedure may be determined prior to receiving the source code for the application, and validating subsequent source code for different applications is performed based on a current container validation procedure that includes subsequent modifications to at least one container validation routine.

FIG. 5B also illustrates additional relationships between blocks 508 and 510 and blocks 508 and 512. In addition to feeding into block 512 as shown in FIG. 5A, block 508 may also feed into block 510. Accordingly, a container generator module may provide information to a validation procedure determiner module to aid in the determination of the container validation procedure. Such information may include, for example, information about the source code for the application and the container for the application, which may better inform the container validation routines that may more optimally used to validate the container. Further, a two-way relationship is shown between blocks 508 and 512. Accordingly (and as discussed above), a container generator module and container validator module may exchange information (and in some embodiments the entire container as it is being generated and validated) to generate and validate the container (e.g., validating a non-final container and then validating the final output container once it has been generated). At block 518, the computer system 100 (e.g., with storage 114) or computer system 300 (e.g., with storage 314) stores the results of the validation. At block 520, a user interface generates a display including the results of the validation for a user's review. After block 520, if the container has been successfully validated the validated container may be deployed on a computer system (e.g., the computer system 100, the computer system 300, or another computer system).

Figure 6:
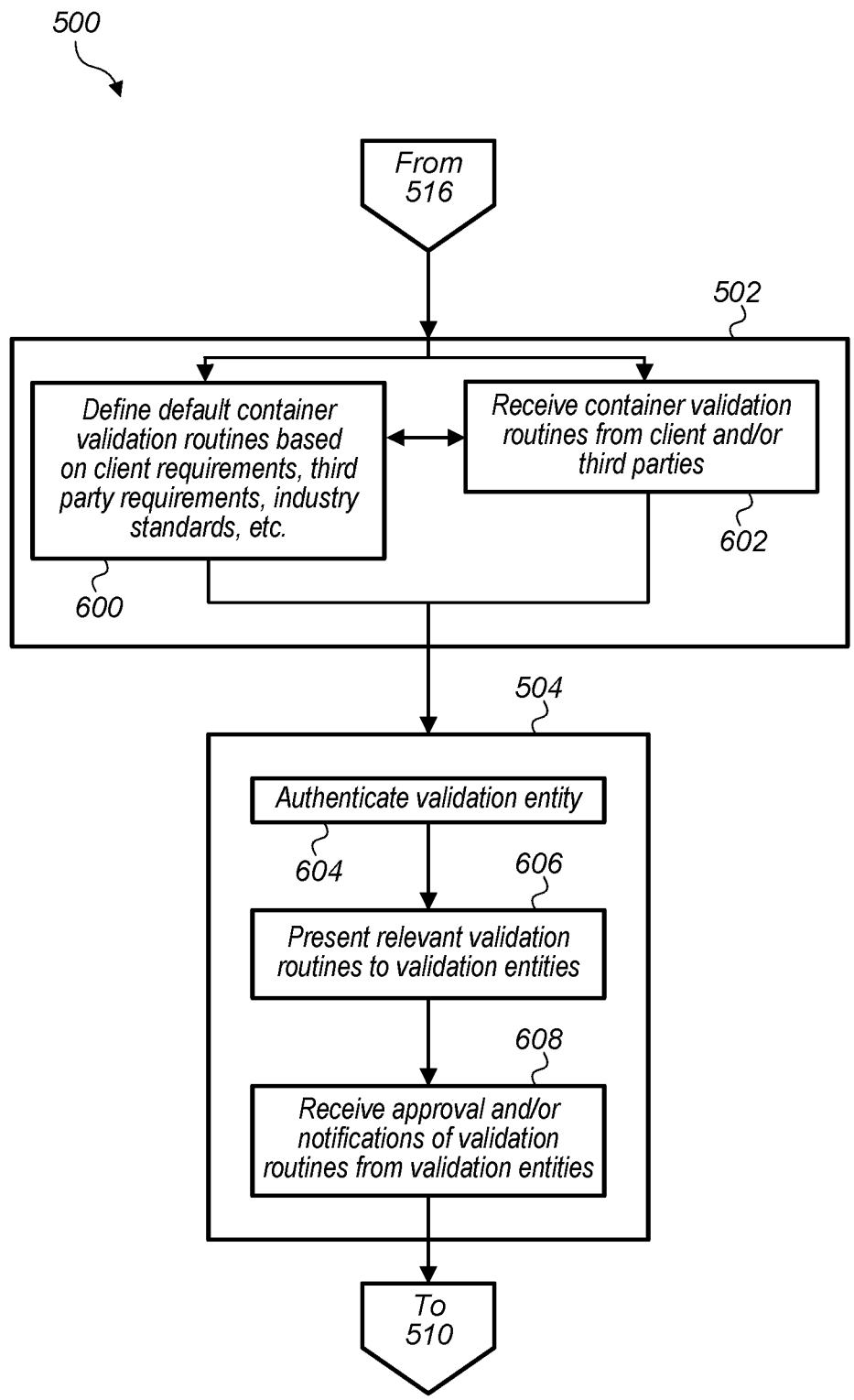
FIG. 6 is a flowchart illustrating various sub-modules of the container validation method of FIG. 5A.

Referring now to FIG. 6, a flowchart illustrating various sub-modules of blocks 502 and 504 of container validation method 500 is shown. As part of block 502, a computer system 100 or computer system 300 may define default container validation routines based on client requirements, third party requirements, industry standards, etc. at block 600. At block 602 (and as part of block 502), a computer system 100 or computer system 300 may receive container validation routines from a client (e.g., the person or organization desiring to validation a container) and/or third parties (e.g., validation entities, vendors acting as validation entities, etc.). As part of block 504, one or more validation entities may be authenticated at block 604. At block 606, a computer system 100 or computer system 300 presents relevant validation routines to validation entities (e.g., with a user interface). As discussed herein, a validation entity may only be presented with validation routines that which the validation entity is permitted to view and approve or modify. At block 608, a computer system 100 or computer system 300 may receive approval and/or modifications (e.g., in the form of validation information) of validation routines from validation entities. Blocks 600-608 may be performed independent of a particular container to be validated. In such cases, the determined container validation routine may be determined based on a currently specified plurality of container validation routines when a particular container is to be validated.

Figure 7A:
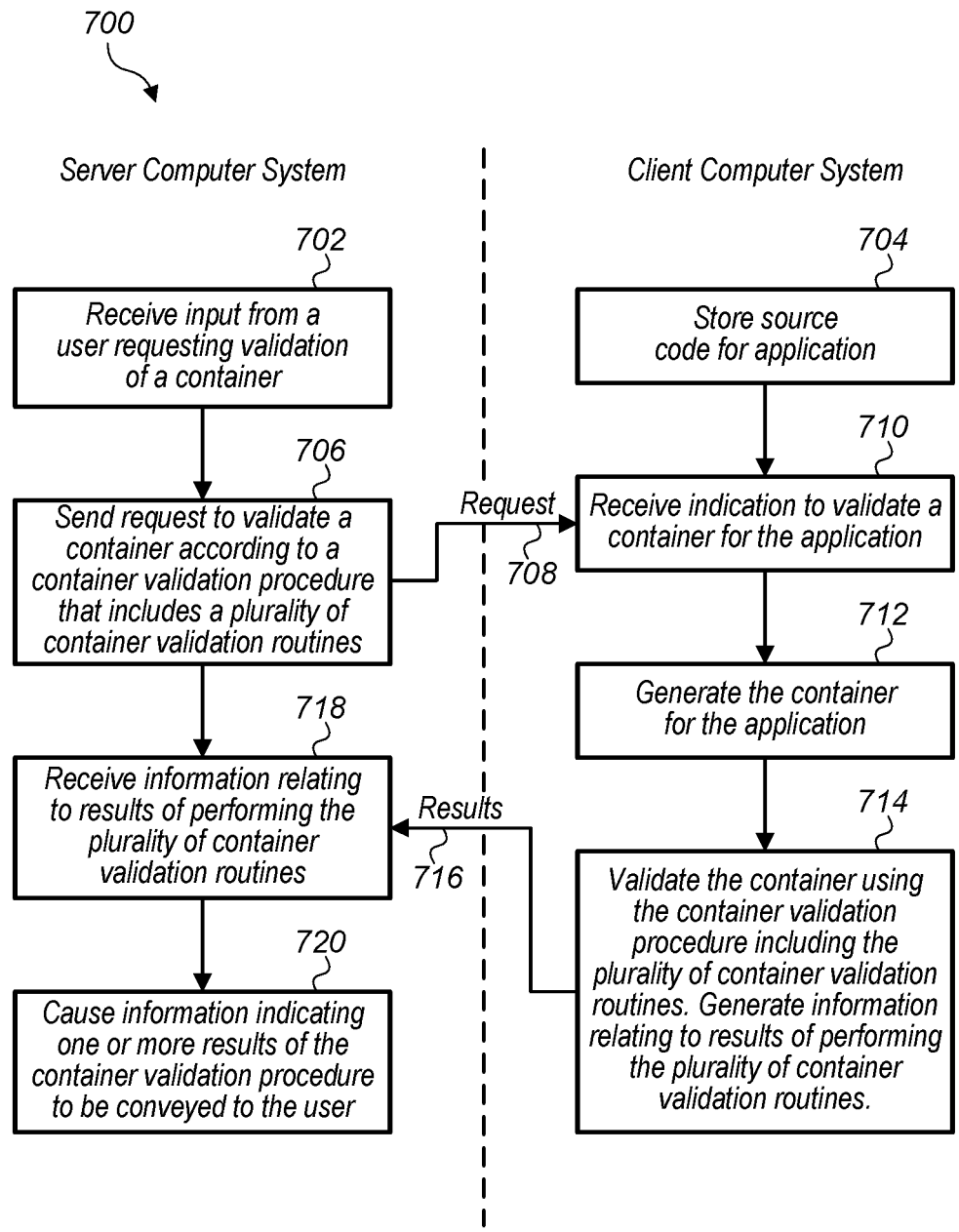
FIG. 7A is a flowchart illustrating a hybrid container validation method in accordance with certain embodiments.

Referring now to FIG. 7A, a flowchart illustrating a hybrid container validation method 700 is shown. The method 700 is performed with the computer system 300. Blocks 702, 706, 718, and 720 are performed by the server computer system 310 and blocks 704, 710, 712, and 714 are performed by the client server computer system 320. At block 702, the server computer system 310 receives input from a user requesting validation of a container for an application. At block 704, the client computer system 320 stores source core for an application. At block 706, the server computer system 310 sends, to an agent program running on a second, remote computer system (e.g., the client computer system 320), a request 708 to validate the container according to a container validation procedure that includes a plurality of container validation routines that are specified by a plurality of validation entities. At block 710, the client computer system 320 receives an indication (e.g., the request 708) from the server computer system 310 to validate a container for an application. At block 712, the client computer system 320 generates the container for the application. At block 714, the client computer system 320 validates the container using a container validation procedure including a plurality of container validation routines specified by a plurality of different validation entities. The validating may include accessing private client information accessible to the client computer system 320 and generating result information relating to results of performing the plurality of container validation routines. The client computer system 320 sends the result information 716, but not private client information accessed during validation, to the server computer system 310. At block 718, the server computer system 310 receives the validation routine output information relating to results of performing the plurality of container validation routines (e.g., the result information 716). At block 720, the server computer system 310 causes information indicating one or more results of the container validation procedure to be conveyed to the user.

Figure 7B:
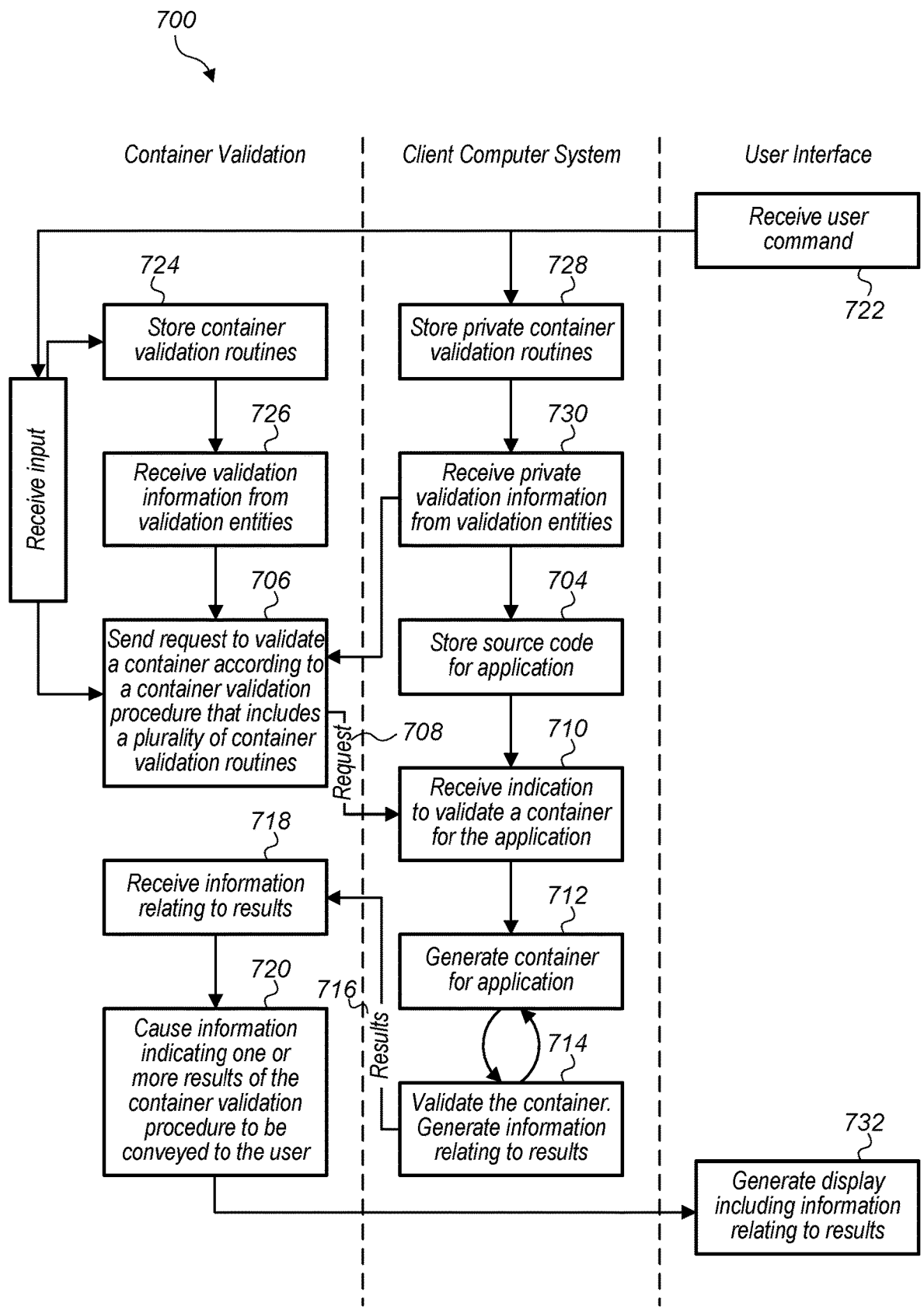
FIG. 7B is an expanded flowchart of the hybrid container validation method of FIG. 7A in accordance with certain embodiments.

Referring now to FIG. 7B, an expanded flowchart illustrating a hybrid container validation method 700 is shown. The method 700 is performed with the computer system 300. FIG. 7B includes the blocks illustrated in FIG. 7A with additional optional steps. At block 722, the user interface 340 may receive a user command and relay it to the rest of the computer system 300, proceeding to block 702 and block 728. Block 702 may proceed to block 706 as shown in FIG. 7A, but alternatively may proceed to block 724. At block 724, the server computer system 310 may receive the user input (e.g., input from a validation entity user) and store container validation routines (e.g., in storage 314). At block 726, the server computer system 310 may receive validation information from one or more validation entities. At block 728, the server computer system 320 may receive the user input (e.g., input from a validation entity user) and store private container validation routines (e.g., in storage 408). At block 730, the client computer system 320 may receive private validation information from one or more validation entities. After blocks 726 and 730, the method 700 may proceed as discussed in connection to FIG. 7A through block 720. At block 732, the user interface 240 generates a display including information relating to the result information. After block 732, if the container has successfully passed the container validation procedure, the container may be deployed. For example, the client computer system 320 may receive from the server computer system 310, an indication to deploy the container on the client computer system 320 and deploy the container on the client computer system 320 in response to the indication.

Figure 8:
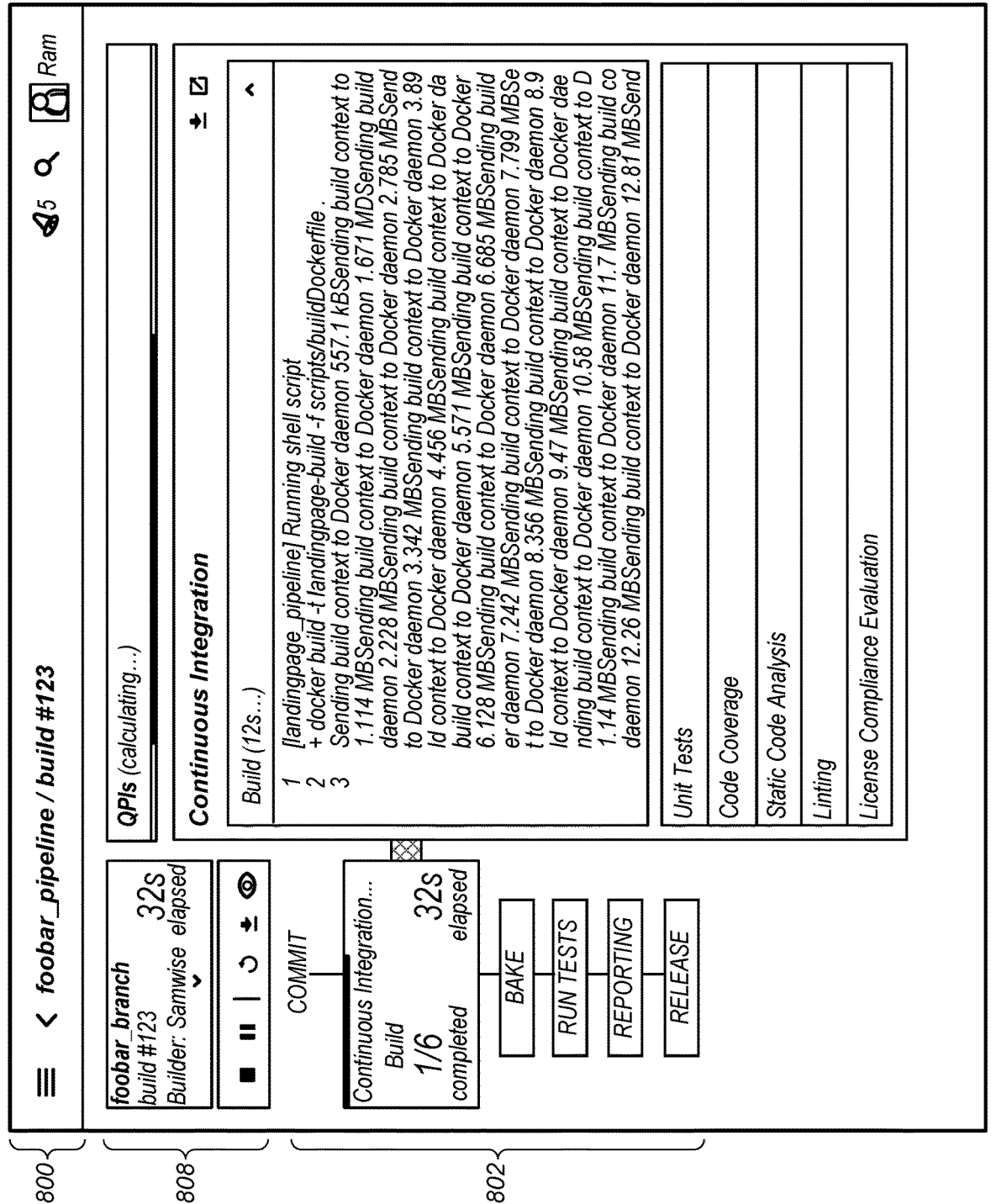
FIG. 8 is an example illustration of a screen showing a container generation and validation in process.
Figure 9A:
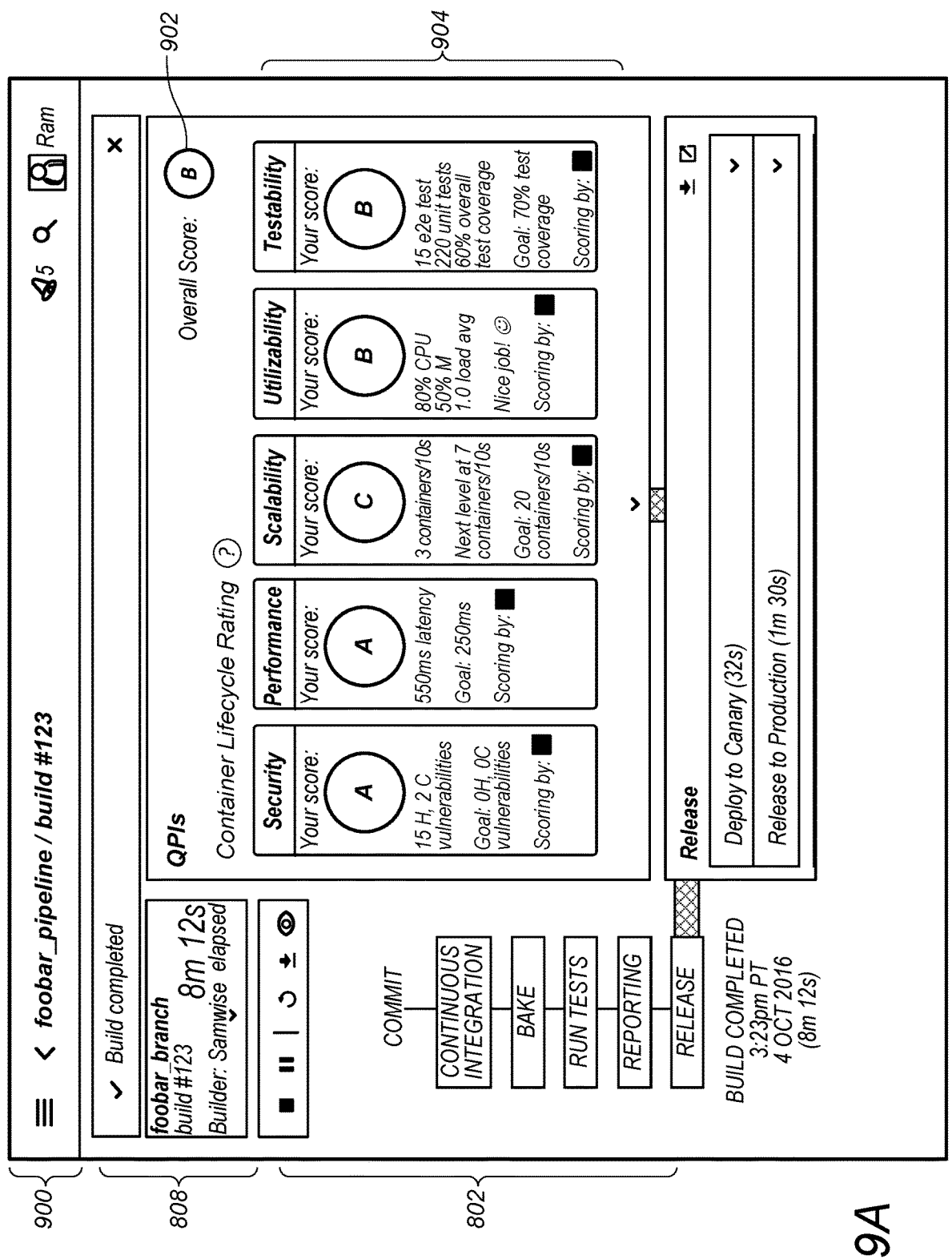
FIGS. 9A and 9B are example illustrations of screens the results of a container generation and validation procedure in accordance with the disclosed embodiments.
Figure 9B:
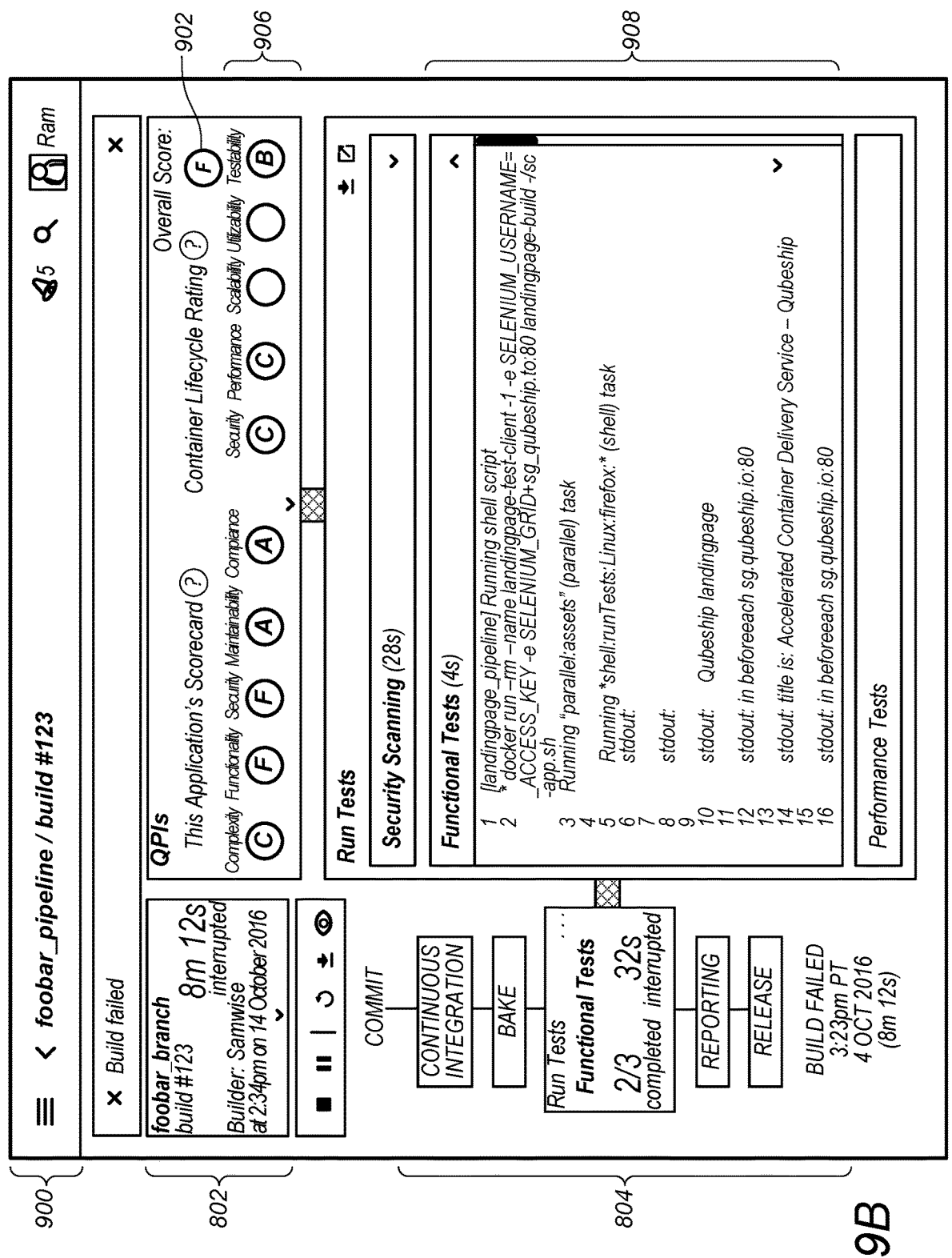

Referring now to FIGS. 8, 9A, and 9B, example screens of a user interface are shown. FIG. 8 is an example illustration of a screen 800 showing a container generation and validation in progress. Timeline 802 includes an indication of which of five steps in the process represented to the user (e.g., continuous integration a.k.a. build, bake, run tests, reporting, and release) is currently being executed. It will be understood, however, that the process of generating and validating a container may include different steps as discussed herein. The process shown on the user interface 800 may be simplified for the user, and thus various container validation routines may be grouped together. Timeline 802 shows that the first of six the build validation routines is being performed currently. Box 804 provides more detailed information about the current phase of the validation (i.e., continuous integration in screen 800) and box 806 provides still more detail on the particular container validation routine(s) being performed. Box 808 shows information about the container being validated including the name, builder, etc.

Referring now to FIGS. 9A and 9B, example container validation result screens 900 are shown. The screen 900 shown in FIG. 9A indicates a passing result. Screen 900 includes the timeline 802 and box 808, which show that the container validation procedure took a little over eight minutes to perform. Screen 900 includes an overall score 902. Screen 904 also includes a plurality of individual results 904: security, performance, scalability, utilizability, and testability. Each individual result 904 may include a grade as well as additional details that determined the grade (e.g., in the security individual result the overall score is an A with 15 high (H) vulnerabilities and 2 critical (C) vulnerabilities), a goal for further improvement, and an indication of the validation entity that aided in the determination.

Referring now to FIG. 9B, another example container validation result screen 900 is shown. The screen 900 shown in FIG. 9B indicates a failing result. Timeline 804 shows that the container validation procedure stopped during the "run tests" portion. Overall score 902 indicates a failing grade. Report card 906 shows high level individual results for complexity, functionality, security, maintainability, compliance, as well as results for security, performance, scalability, utilizability, and testability. The container represented in FIG. 9B failed functionality and security tests, both with F grades. Box 908 shows the container validation routine(s) being performed when the validation ended early due to failure.

Exemplary Computer System

Figure 10:
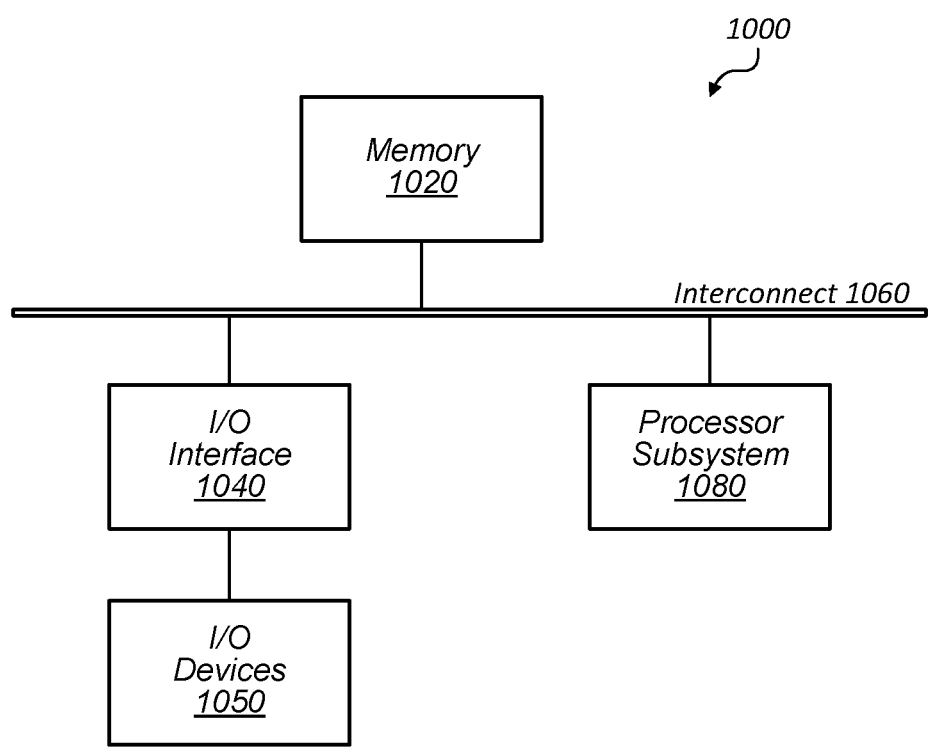
FIG. 10 is a block diagram of an exemplary computer system, which may implement the various components of the FIG. 1-4.

Turning now to FIG. 10, a block diagram of an exemplary computer system 1000, which may implement the various components of the computer system 100 (including the container validation computer system 230) and the computer system 300 (including the server computer system 310 and client computer system 320), is depicted. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Computer system 1000 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable store program instructions executable by processor subsystem 1080 to cause system 1000 perform various operations described herein. System memory 1020 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   prior to generating a container for an application, receiving, at a computer system from a plurality of validation entities, validation information corresponding to at least two of a plurality of container validation routines;
   receiving, at the computer system, source code for the application;
   generating, with the computer system, the container for the application, wherein the container is an executable package that includes the source code and runtime information for the application;
   determining, with the computer system, a container validation procedure based on the validation information, wherein the container validation procedure comprises the at least two of the plurality of container validation routines; and
   validating, with the computer system, the container using the at least two of the plurality of container validation routines without further input of validation information from the plurality of validation entities.

2. The method of claim 1, further comprising:
   after validating the container using the container validation procedure, receiving, at the computer system from one or more validation entities, additional validation information corresponding to one or more container validation routines;
   determining, with the computer system, a second container validation procedure based on the additional validation information; and
   validating, with the computer system, a second container using the second container validation procedure.

3. The method of claim 1, wherein the received validation information approves default values for a particular one of the plurality of container validation routines.

4. The method of claim 1, wherein the received validation information modifies default values for a particular one of the plurality of container validation routines.

5. The method of claim 1, further comprising:
   prior to generating the container for the application, providing an interface that allows the plurality of validation entities to specify, independent of a particular container to be validated, ones of the plurality of container validation routines; and
   wherein the container validation routine is determined based on a currently specified plurality of container validation routines.

6. The method of claim 1, wherein the validation information includes information received from a plurality of remote computer systems.

7. The method of claim 1, wherein the plurality of container validation routines corresponds to a first container validation platform, the method further comprising:
   operating one or more additional container validation platforms on the computer system, at least one of which has a different current container validation procedure from that of the first container validation platform.

8. The method of claim 1, further comprising:
   deploying the validated container to a second computer system.

9. A method comprising:
   receiving, at a computer system, source code for an application;
   generating, with the computer system, a container for the application, wherein the container is an executable package that includes the source code and runtime information for the application;
   determining, with the computer system, a container validation procedure comprising a plurality of validation routines including a first container validation routine and a second container validation routine; and
   validating, with the computer system, the container using the container validation procedure, wherein the first container validation routine is used to validate the container while the container is being generated and the second container validation routine is used to validate the container after the container has been generated, wherein validating the container includes providing an indication of individual results of the plurality of container validation routines, and an overall validation result based on the individual results.

10. The method of claim 9, further comprising:
    deploying the validated container to a second computer system.

11. The method of claim 9, further comprising
    receiving, at the computer system, source code for a second application;
    generating, with the computer system, a second container for the second application, wherein the container is an executable package that includes the source code and runtime information for the application; and
    validating, with the computer system, the container using the container validation procedure.

12. The method of claim 9, further comprising
    receiving, at the computer system, source code for a second application;
    generating, with the computer system, a second container for the second application, wherein the container is an executable package that includes the source code and runtime information for the application;
    determining, with the computer system, a second container validation procedure comprising a plurality of validation routines; and
    validating, with the computer system, the container using the second container validation procedure.

13. The method of claim 9, further comprising
receiving, at the computer system from a plurality of validation entities, validation information corresponding to at least two of the plurality of container validation routines;
wherein determining the container validation procedure includes determining the container validation procedure based on the validation information.

14. The method of claim 9, wherein determining the container validation procedure includes:
receiving, at the computer system from a remote computer server, the container validation procedure.

15. The method of claim 14, wherein validating the container using the container validation procedure includes accessing private information accessible to the computer system but inaccessible to the remote computer server.

16. A non-transitory computer-readable medium storing instructions that when executed by a computer system cause the computer system to implement operations comprising:
receiving, at the computer system, source code for an application;
generating, with the computer system, a container for the application, wherein the container is an executable package that includes the source code and runtime information for the application;
determining, with the computer system, a container validation procedure comprising a plurality of validation routines including a first container validation routine and a second container validation routine; and
validating, with the computer system, the container using the container validation procedure, wherein the first container validation routine is used to validate the container while the container is being generated and the second container validation routine is used to validate the container after the container has been generated, wherein validating the container includes providing an indication of individual results of the plurality of container validation routines, and an overall validation result based on the individual results.

17. The computer-readable medium of claim 16, the operations further comprising:
receiving, at the computer system from a plurality of validation entities, validation information corresponding to at least two of the plurality of container validation routines; and
wherein determining the container validation procedure includes determining the container validation procedure based on the validation information.

18. The computer-readable medium of claim 16, wherein determining the container validation procedure includes:
receiving, at the computer system from a remote computer server, the container validation procedure.

19. The computer-readable medium of claim 18, wherein validating the container using the container validation procedure includes accessing private information accessible to the computer system but inaccessible to the remote computer server.

20. The computer-readable medium of claim 16, the operations further comprising:
present a graphical indication corresponding to results of the container validation procedure.

* * * * *